Figure 1:
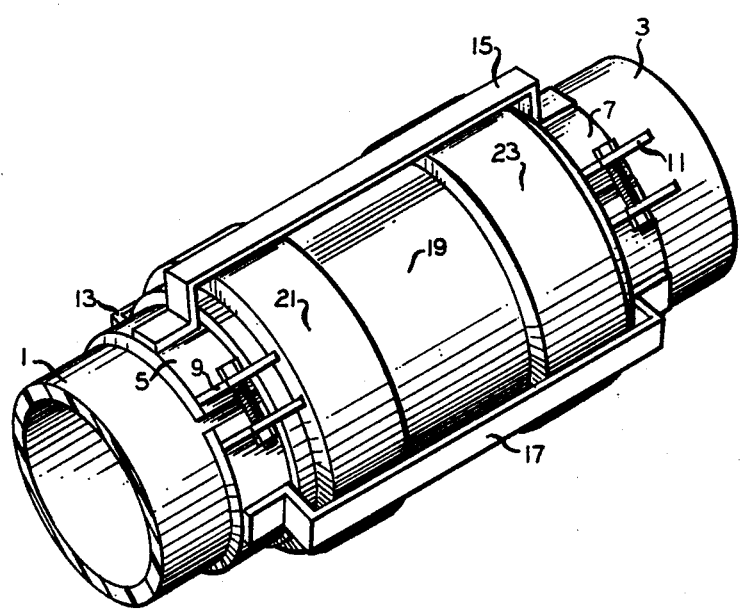

United States Patent [19]

Wood et al.

[11] 4,109,941
[45] Aug. 29, 1978

[54] COUPLING FOR PLASTIC PIPE

[75] Inventors: Roy F. Wood; Ralph A. Wynne, both of Dallas, Tex.

[73] Assignee: Phillips Petroleum Company, Bartlesville, Okla.

[21] Appl. No.: 693,981

[22] Filed: Jun. 8, 1976

[51] Int. Cl.[2] .................. F16L 17/04; F16L 19/08
[52] U.S. Cl. ................................. 285/111; 285/114; 285/369; 285/423; 403/312
[58] Field of Search ............... 285/236, 111, 423, 369, 285/373, 114, 419; 403/300, 303, 312; 29/451

[56] References Cited

U.S. PATENT DOCUMENTS

| | | | |
|---|---|---|---|
| 1,196,785 | 9/1916 | Johnson | 285/342 |
| 2,114,366 | 4/1938 | Barnes | 285/348 |
| 2,651,329 | 9/1953 | Fowler, Jr. | 285/373 X |
| 2,901,269 | 8/1959 | Rickard | 285/111 |
| 2,944,839 | 7/1960 | Anderson | 285/114 X |
| 3,252,192 | 5/1966 | Smith | 24/81 R |
| 3,406,986 | 10/1968 | Jennings | 285/21 |
| 3,495,853 | 2/1970 | Furrer | 285/419 X |
| 3,776,579 | 12/1973 | Gale | 285/373 X |

Primary Examiner—Werner H. Schroeder
Assistant Examiner—Conrad L. Berman

[57] ABSTRACT

A means and apparatus for connecting resilient conduit is provided in which a first section of resilient tubing of internal dimensions sufficient to slide over the conduits and having two grooves, one spaced from each end of the internal surface of the section with each groove containing resilient gasket material substantially filling the groove to form a gasket around the conduit is slid into place so that the conduits to be connected are juxtaposed within the first section of tubing between the gasketed grooves. An encasing tubing is placed around said first section of tubing at least overlying the resilient gasket material. A pair of split metal clamping rings with one ring adjacent each end of the first tubular section and joined by a plurality of spacer bars united at each end to the clamping rings is fitted over the encasing tubing in relation to apply pressure on the encasing tubing when the split rings are united in clamped position. Each ring has grooves between flattened areas of the inner surface which upon uniting of the rings in clamped position cause deformation of the conduit surface into the grooves thereby aiding in holding the clamped conduits in position.

6 Claims, 7 Drawing Figures

COUPLING FOR PLASTIC PIPE

BACKGROUND OF THE INVENTION

This invention relates to resilient piping. In a more specific aspect this invention relates to plastic piping and more particularly to the joining of plastic piping. In another of its aspects this invention relates to quick coupling for piping.

The use of plastic pipe has been greatly increased in recent years finding application in many of the uses formerly confined to metal pipe. Plastic pipe now is used for carrying fluids, both gases and liquids, and even for electrical-duct work.

The usual method for joining plastic pipe is by fusing pipe ends together with a fusion machine. A fusion machine has inherent shortcomings of the necessity of a power source and of being sufficiently bulky that the use of these machines is prohibited in close quarters. Because of these shortcomings, systems have been developed for quick-coupling of plastic pipe. Some of the systems developed for quick-coupling of plastic pipe are equally advantageous for the coupling of pipe made of other resilient materials.

Most of these coupling devices can be said to be made up of a means for providing a pressure-resistant gasket for the juxtaposition of the conduits being joined and a means for holding the conduits in adjacent position within the confines of the gasket. One of the major problems in joining conduits made of plastic and similar resilient material is the anchoring of the abutted conduit to prevent movement of the conduit in either direction without damaging the outside surface of the conduits. A piping clamp such as is taught in U.S. Pat. No. 3,252,192 in which particles such as shot or other material is attached to the face of a clamping member to provide a gripping surface is poorly adaptable for use with conduits made of plastic and other similar resilient material because of the potential damage done to the exterior surface of the pipe.

We have provided a method and apparatus by which conduits of plastic or other resilient material can be firmly anchored without permanently damaging the exterior surfaces of the pipe.

It is therefore an object of this invention to provide method and apparatus for coupling conduits made of plastic or other resilient material. It is another object of this invention to provide a clamping means that will suitably anchor plastic piping without permanently damaging the external surface of the conduits. It is another object of this invention to provide conduit joined by coupling with the method and apparatus of this invention.

Other aspects, objects, and the various advantages of this invention will become apparent upon reading the specification and the appended claims.

STATEMENT OF THE INVENTION

According to this invention, a method and means for connecting conduits made of plastic or other similar resilient material is provided. The apparatus is made up of a first section of tubing of internal dimensions sufficient to slide over the juxtaposed conduits. This section of tubing has two grooves on the internal surface of the section with one groove spaced from each end of the section. Within each groove is positioned resilient gasket material sufficient substantially to fill the groove so that the gasket material will encircle the conduit to form a pressure-tight seal. Overlying the first section of tubing at least overlapping the tubing to each side above each groove, encasing tubing is positioned. A pair of split metal clamping rings with one ring adjacent each end of the first section of tubing with a plurality of spacer bars united at each end to the clamping rings so that the bars fit over the encasing tubing in relation to apply pressure on the encasing tubing when the split rings are united in clamped position provide means for producing a pressure-tight seal at the juxtaposition of conduit ends. The provision of each ring with an inner surface on which there are grooves between flattened areas supplies means for anchoring coupled conduits in adjacent position without damaging the outer surfaces of the conduits.

In one embodiment of the invention, coupling of conduits made of plastic or similar resilient materials is accomplished by aligning the conduits within a first section of tubing of internal dimensions sufficient to slide over the conduits with their juxtaposition between resilient gaskets formed by gasket material encircling the conduits within grooves spaced from each end on the internal surface of the section. This first section of tubing is then overlaid with encasing tubing at least above each of the grooves. The encasing tubing is overlaid with a plurality of spacer bars united at each end to a split clamping ring with the bars fitting over the encasing tubing to apply pressure on the encasing tubing when the split rings are united in clamped position. Upon uniting the split rings in clamped position, grooves between flattened areas on the inner surface of each ring grip sufficiently tightly to deform the outer surface of the conduits to enable the conduits to be held snuggly in position without damaging the outer surface of the conduits.

In another embodiment of the invention, a coupled pipe made of plastic or similar resilient material is provided by encasing juxtaposed conduits using the apparatus of this invention as set out above.

Although coupling as set out in this invention are suitable for use with any plastic or similarly resilient piping with diameter of up to 36 inches or even more, they are best used with piping of 6 inch diameter or less. An important aspect of the invention is the protection of the outer surface of the conduits using the grooved clamping device of this invention which does not have sharp edges that would tend permanently to damage the conduits. The invention is, therefore, particularly suitable for use with those materials of construction that can be cut or scarred with sharp tooth threads or materials that can embed in the surface of the conduit. The invention is particularly useful with such materials as various grades of polyethylene, polypropylene and other polyolefins and with polyvinylchloride and nylon along with certain natural and synthetic rubber-coated materials. The invention can be used to join conduits made of the same material of construction as well as different materials of construction. The major limitation being that the conduit should be of substantially the same external dimensions.

The sections of tubing, both that used to overlie the conduits and that used for encasing the first section of tubing, can be made of any material that has physical properties combining sufficient strength to permit the interior of a tubing to be grooved combined with sufficient resilience for there to be an effect of increasing the pressure on the gasket material in the grooves when overlying pressure is applied by the bars joining the clamp rings. In general, the plastics and rubbers mentioned above are those preferred for use as a first section of tubing and encasing tubing.

The resilient gasket can be an O-ring type of sufficient size substantially to fill the gasket grooves or can be resilient material packed into the gasket groove. The function of this material is to provide a leakproof seal between the outside surface of a juxtaposed conduit and the inside surface of the overlying first section of tubing under the compressive influence of the spacer bars as transmitted through the encasing tubing when the split rings are united in clamped position.

Although the major criterion for material of construction of the spacer bars and split clamping rings is that they be sufficiently rigid to maintain their original conformation in the clamped position, which would include various rigid plastics as suitable materials of construction, the clamping rings and spacer bars will usually be made of metal. While various metals and alloys of metals can be used the material of construction is best suited to the end use of the pipe being joined so that upon contacting spillage, a minimum of problems with corrosion will be encountered. The most preferred material of construction is steel.

The split rings are constructed with a plurality of sections best suited for each of installation according to the size of the conduits being joined. Since the invention is suitable for use with conduits of up to 36 inches or more depending upon the service it can be seen that four or even more sections of split ring may be convenient, although in lesser diameter pipe two sections joined by bolting through complementary bars should prove most convenient.

It has been stated before that the heart of this invention is the use of a flattened surface with circumferential grooves as the gripping surface of the split rings which are used to hold the pipe in coupled position. This type of clamping ring is particularly useful in use with conduits having material of construction that can be deformed when compressed by the clamping rings so that the outer surface of the conduits conforms itself to the shape of flattened surface and groove. This deforming into the grooves of the clamping ring provides the anchor necessary between these surfaces to prevent slippage of the conduit when pressure is applied within the conduit. Such conformation is superior to the biting of a sharp edge into a plastic or rubber surface in that the sharp edge can easily form a shear line which, under pressure service, can rupture the conduit.

In general, a multiplicity of parallel grooves, either transverse the length of the conduit or cut as a spiral thread in the ring surface before the ring is split, will serve well for the purpose of this invention. As a general rule, a groove of about 25 percent to about 50 percent of the wall thickness of the pipe is sufficient to provide the gripping surface necessary. For instance, a groove of about 0.375 inches (0.952 cm) is adequate for pipe up to 10 diameter. The shape of the groove is not critical as long as there is sufficient flat surface between the grooves to prevent scoring of the surface into the conduit being clamped.

Figure 2:
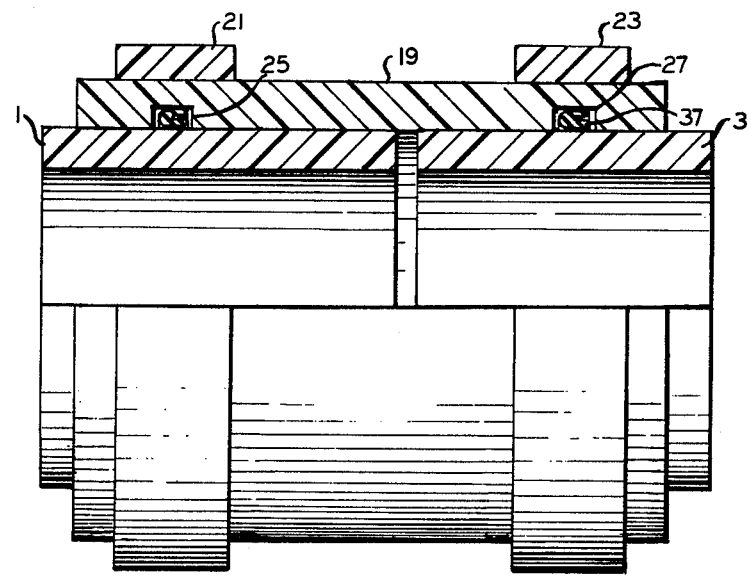
Figure 3:
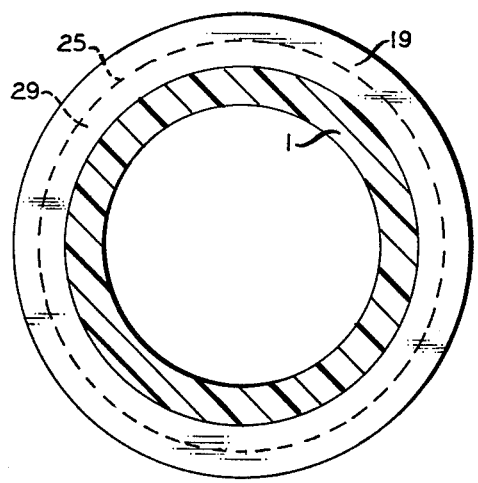
Figure 4:
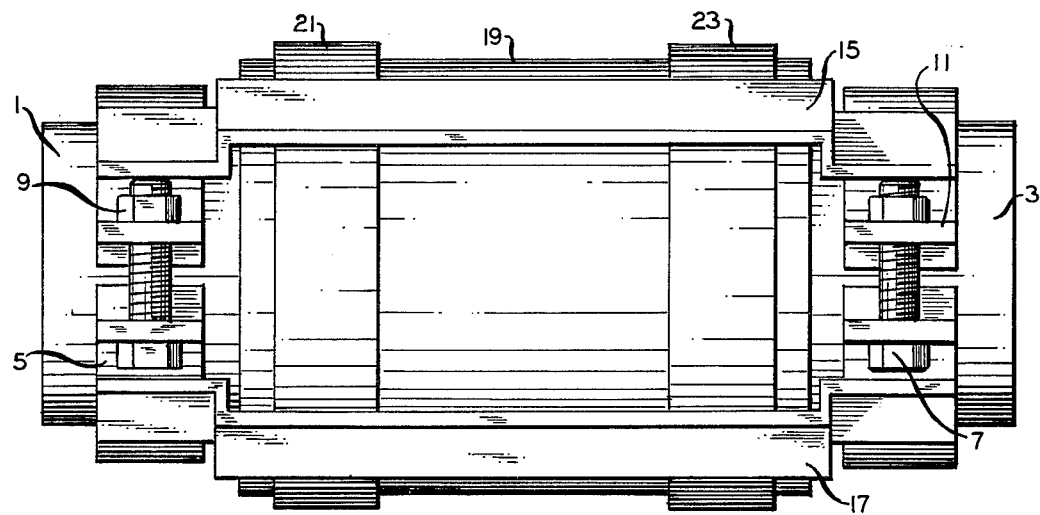
Figure 5:
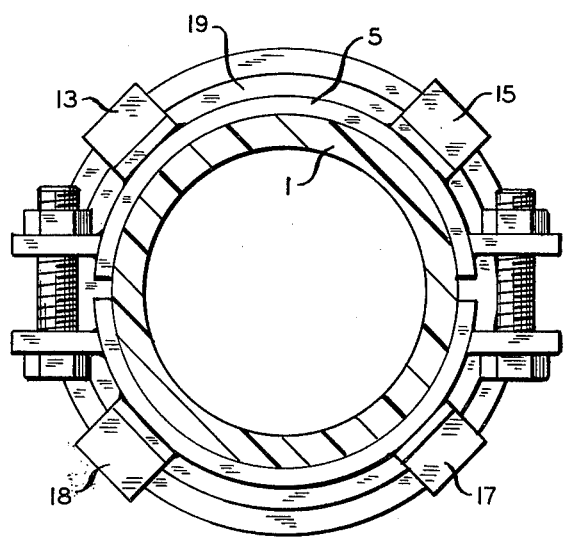
Figure 6:
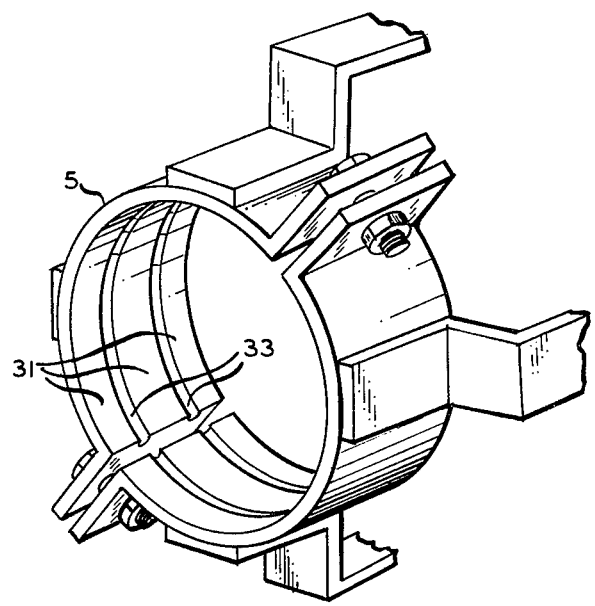
Figure 7:
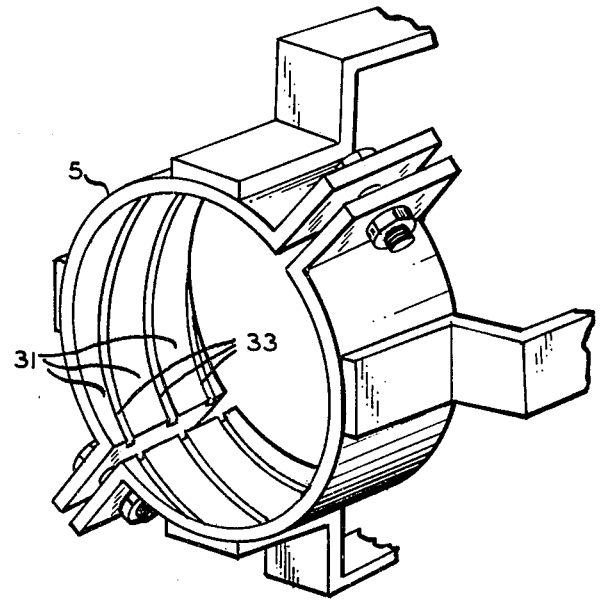

The invention can best be understood when described in conjunction with the drawings which show in FIG. 1 a perspective view of conduit sections clamped according to this invention;

in FIG. 2 a partially cut-away side view of the first section of tubing, gaskets, and encasing tubing;

in FIG. 3 an end view of the conduit, first section of tubing and gaskets;

in FIG. 4 a side view of the clamp ring and spacer bars overlying the encasing tubing, the first section of tubing, and the conduits;

in FIG. 5 an end view of a clamp ring united in position on a conduit; and in FIGS. 6 and 7 a perspective view showing internal grooves in a united split ring.

Referring now to FIG. 1 conduit sections 1, 3 are shown held in position by split-clamp rings 5, 7 united by bolted ears 9, 11. The split rings 5, 7 are joined by spacer bars 13, 15, 17 which extend outward from the split ring sufficiently to accomodate the first section of tubing 19 overlaid with two bands of encasing tubing 21, 23 so that the spacing bars exert pressure on the encasing tubing and the first section of tubing.

Referring now to FIG. 2, the conduits 1, 3 are shown in aligned position within the first section of tubing 19 on the interior surface of which are grooves 25, 27 containing resilient gasket material 29, 37 which encircles the adjacent conduits 1, 3 and are acted upon through encasing tubing 21, 23 by the spacer bars (13, 15, 17, 18, as shown in FIG. 1 and FIG. 5) to form a pressure-tight seal between the first section of tubing 19 and the conduits 1, 3.

In FIG. 3 is shown the relationship of the pressure-tight seal with gasket 29 filling the groove 25 in first section of tubing 19 to form a seal with conduit 1.

In FIG. 4 conduits 1, 3 are clamped into position by split-clamp ring 5, 7 which are secured in position by bolted complimentary ears 9, 11. The spacer bars 15, 17 press on encasing tubing 21, 23 exerting pressure on the first section of tubing 19 and through it on resilient gasket (29, 31 as shown in FIG. 2). It is apparent that although the encasing tubing 21, 23 is shown here as a pair of tubing bands, this component can be a single encasing tubing. The narrower bands are preferred as easier to install and as using less material.

In FIG. 5 and FIG. 6 the internal grooves 33 of clamping ring 5 are shown. In FIG. 5 the relationship between conduit 1 and clamping ring 5 in a clamped position with the conduit deformed into the grooves 33 is shown. FIG. 6 is used to illustrate parallel grooves 33 and parallel flat surfaces 31 on the internal surface of the clamping ring 5. FIG. 7 is used to illustrate spiral thread grooves 35 with interventing flat surfaces 31 on the internal surface of the clamping ring 5.

In coupling conduits according to this invention, it is important for ease of installation if unitary circlets of encasing tubing 21, 23 are used first to insert this tubing over the end of the conduits 1, 3 before the conduits are slid into position within first section of tubing 19 with resilient gasket 29, 31 in place at the time of insertion of the conduit. The encasing tubing 21, 23 can then be positioned.

This problem will not exist if split rings are used as encasing tubing 21, 23 thereby allowing this tubing to be positioned after insertion of the conduits in the first section of tubing.

We claim:

1. An apparatus for connecting conduits of equal external dimensions aligned end-to-end comprising:
  (a) a first section of tubing of internal dimensions to slide over juxtaposed conduits of equal external dimensions at the juxtaposition of the conduits, said first section of tubing having two grooves, one spaced from each end of the internal surface of the section;

(b) resilient gasket material for encircling said conduits and substantially filling said two grooves;

(c) encasing tubing overlying said first section of tubing at least surrounding each of said grooves; and (d) a pair of split metal clamping rings, each ring comprising as a clamping surface on its inner surface a plurality of interspaced grooves adapted to receive the deformed surface of a conduit compressed by the clamping ring positioned with one ring adjacent each end of said first tubular section with spacer bars joining said clamping rings, said spacer bars fitting over the encasing tubing in relation to apply pressure on the encasing tubing with the split rings in clamped position.

2. An apparatus of claim 1 comprising split clamping rings wherein said grooves are parallel to each other and transverse the length of the ring.

3. An apparatus of claim 1 comprising split clamping rings wherein said grooves are cut as a spiral thread.

4. An apparatus of claim 1 comprising split rings adapted to be united by complementary fasteners.

5. An apparatus for connecting conduits of claim 1 in which said encasing tubing comprises a pair of tubing bands.

6. A pair of conduits of equal external dimensions aligned end-to-end and joined by an apparatus of claim 1.

* * * * *